July 17, 1962  H. A. MILLER, JR  3,044,486
GAS STORAGE AND DELIVERY SYSTEM
Filed June 10, 1959  2 Sheets-Sheet 1
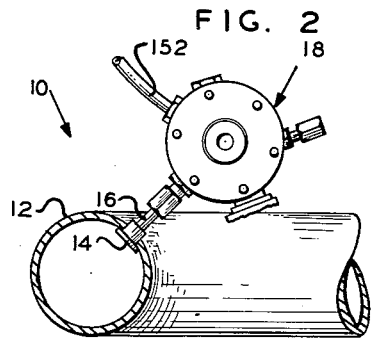
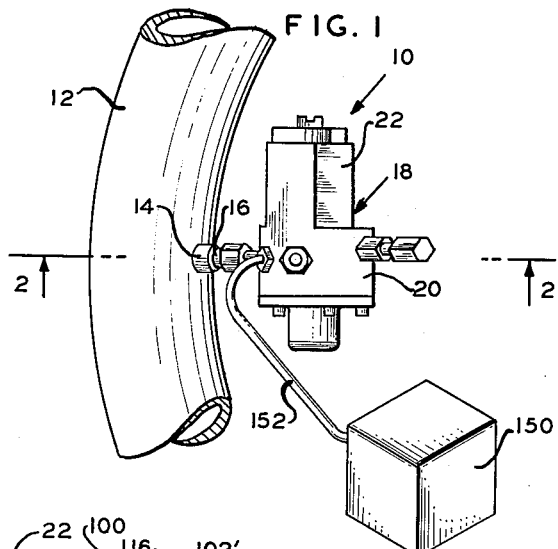
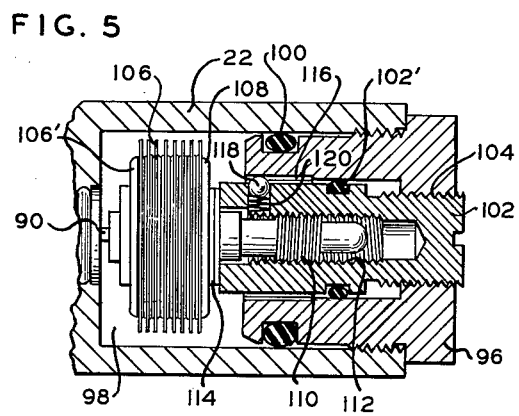
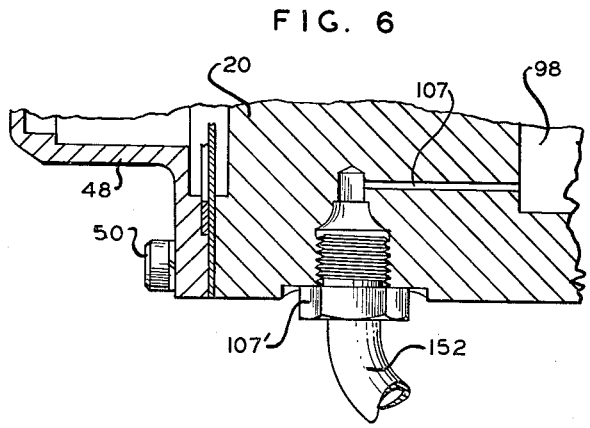
INVENTOR.
HENRY A. MILLER, JR.
BY
AGENT July 17, 1962  H. A. MILLER, JR  3,044,486
GAS STORAGE AND DELIVERY SYSTEM
Filed June 10, 1959  2 Sheets-Sheet 2

INVENTOR.
HENRY A. MILLER, JR.
BY
*Milford F. Lietze*
AGENT

United States Patent Office 3,044,486
Patented July 17, 1962

3,044,486
GAS STORAGE AND DELIVERY SYSTEM
Henry A. Miller, Jr., Scotch Plains, N.J., assignor to Air Reduction Company, Incorporated, New York, N.Y., a corporation of New York
Filed June 10, 1959, Ser. No. 819,413
2 Claims. (Cl. 137—505.42)

This invention relates to gas pressure regulator devices and more particularly to a device especially adapted to afford the delivery of a gas under substantially precise control of delivery pressure from a source of gas pressure greatly in excess of conventional pressure sources. The invention also concerns a unique high pressure gas system for delivering gases that are at a substantially reduced pressure at variable flow rates and under precise pressure regulating conditions.

Conventional regulator devices are available for administering gases such as oxygen from standard compressed gas cylinders under normal operating pressures extending up to the vicinity of 2,500 p.s.i. Significant problems are encountered, however, in safely and effectively administering oxygen or other gases from gas sources substantially higher in pressure such as in the vicinity of 7,500 p.s.i. With oxygen, for example, the possibility of ignition of combustible materials such as the high pressure seat, which may accompany the heat of compression resulting from the introduction of such high pressure gas to the regulator inlet greatly exaggerates the problem of seat ignition as compared to normal pressure ranges. The extremely high pressure, of course, also imposes more exacting requirements with respect to effective gas-tight sealing. Accordingly, it is an object of the present invention to provide a high pressure gas delivery system which is effective to safely accommodate relatively high gas pressures and to effectively and accurately deliver such gases at a predetermined lower delivery pressure.

The use of relatively high pressure sources, especially for oxygen has been found to afford significant advantages in high altitude flights or in outer space vehicles where the necessary supplies of such gases may be provided with a minimum weight and size. Accordingly, for these applications, especially, there is an additional urgent need for a supply system effective for use at relatively high pressures wherein the pressure regulating device embodied therein provides the necessary performance characteristics with respect to delivery flow rates and the maintenance of precise delivery pressures and which is, at the same time, of the utmost compactness and of minimum weight. Conventional regulator means, of course, do not normally furnish any satisfactory solution to such problems inasmuch as they either are not directly concerned with the accommodation of such relatively high inlet pressures or are not especially designed to be of minimum bulk and weight. Accordingly, it is a further object of the present invention to provide a gas delivery system which effectively satisfies such stringent requirements without sacrificing performance characteristics.

A still further object of the present invention is to provide a high pressure gas storage and delivery system having a high pressure storage vessel and discharge valve means therefor, wherein said discharge valve means comprises a unique high pressure regulator device effective to accurately deliver a predetermined desired flow of precisely regulated gas and which is arranged to permit the filling of such storage vessel without the necessity of detaching or separating such discharge valve means from said storage vessel.

A still further object of the present invention is to provide a high pressure regulator device such as referred to above, having two stages of regulation, wherein the second stage of regulation is provided with an aneroid bellows element compactly incorporated so as to permit adjustment of a predetermined desired delivery pressure which may be maintained independently of the surrounding or ambient atmospheric pressure.

Other objects and advantages of the present invention may be more fully understood by reference to the following description of a preferred embodiment of the present invention and the accompanying drawings, wherein:

FIG. 1 is a partial assembly showing a storage and delivery system for a high pressure gas such as oxygen, including a toroidal high pressure container and a compactly designed gas regulator valve delivery device, and showing diagrammatically a system to which the regulated gas is supplied;

FIG. 2 is a sectional view along the line 2—2 in FIG. 1 looking in the direction of the arrows;

FIG. 5 is an enlarged cross-sectional view of the second stage aneroid adjusting mechanism; and FIG. 6 is a partial sectional view along the line 6—6 in FIG. 3 showing the regulator delivery outlet.

Referring now to FIGS. 1 and 2 of the drawings, a high pressure gas storage and delivery system is designated generally by the numeral 10. The high pressure gas such as oxygen, which may be, for example, subjected to an initial filling pressure of about 7,500 p.s.i. is held within a torus-shaped container, only a portion of which is shown at 12. Such shape container has been found particularly suitable for storage of such high pressure gases, with a minimum weight for a given content, where structural limitations do not permit the use of an equivalent spherical container. The torus container is provided with a fitting shown at 14 connected to a high pressure tubular conduit member 16 which is received in the inlet of a high pressure delivery regulator device 18.

Figure 4:
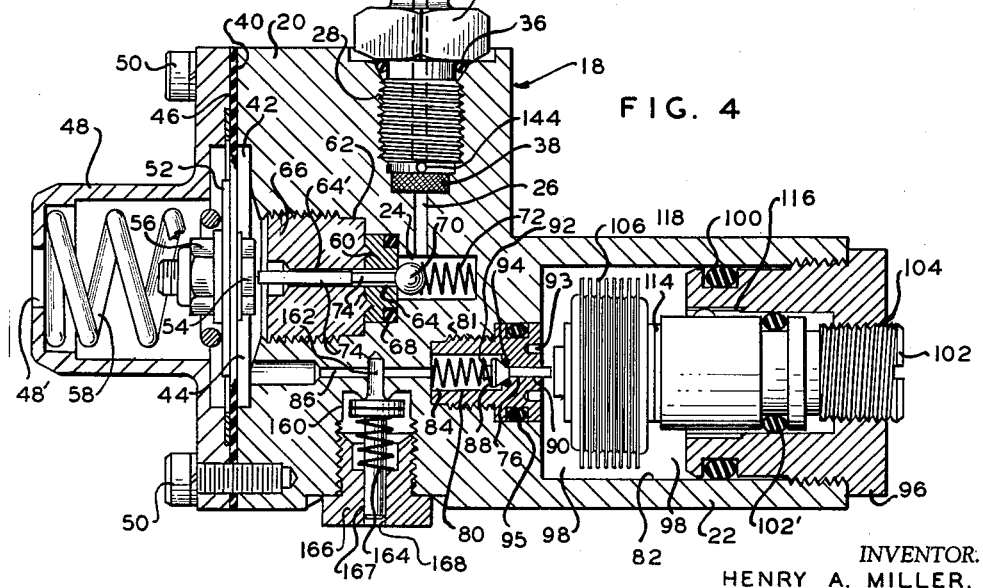
FIG. 4 is a rotated cross-sectional view taken substantially along the line 4—4 in FIG. 3 illustrating the first and second stages of the regulator device.

Referring now to the cross-sectional view of FIG. 4, the internal construction of the regulating device 18 may more readily be described. The regulator has a generally cylindrical body portion 20 from one end of which a generally tubular housing section shown at 22 protrudes. A valve cavity 24 is formed in the cylindrical valve body which is intersected by a relatively small-size inlet passage 26 projecting from the bottom of a threaded inlet opening 28 in which an inlet fitting 30 is received. The fitting 30 is a Parker fitting (trade name of a well known type of high pressure fitting) for accommodating flared-tube conduits. As shown in the cross-sectional view, the tube 16 is flared at its inner end so that the flared portion is retained within a nut 32 that is threaded onto the main body of the fitting 30 received in the regulator inlet. A bushing 31 arranged within the nut 32 is provided with a conical mouth which is adapted to be effectively sealed against the tapered outer end of the fitting 30. An O-ring carried on the shank of the bushing is adapted to form a gas-tight seal between the bushing and the flared end of the tube 16. Thus, by tightening the nut 32 onto the fitting, an effective gas-tight connection is accomplished. It will be seen that an O-ring 36 surrounding the shank of the fitting 30 is compressed against the tapered outer end of the cavity 28 to effectively seal the inlet seating in the body of the regulator. A porous plug which may, for example, be a sintered stainless steel plug of suitable porosity is disposed at the bottom of the inlet cavity 28 to prevent the admission of any dirt or other foreign particles from advancing beyond this point into the internal mechanism of the regulator.

The end face of the regulator body shown at 40 is recessed at 42 to provide an intermediate, or inter-stage, pressure chamber 44 which is sealed from the surrounding atmosphere by a flexible diaphragm 46. The diaphragm 46 is held against the face of the valve body and sealed around its periphery by an end cap 48 which is tightened against the valve body by a series of circumferentially spaced retaining screws 50. A backing plate 52 is clamped at the center of the diaphragm between the head 54 of a retaining screw and a nut 56 which is carried thereon. A coil spring 58 is housed in the end cap 48 under compression so as to assert a predetermined force inwardly against the diaphragm member. The end cap is open at 48' to allow atmospheric pressure also to act inwardly against the diaphragm.

A high pressure valve seat shown at 60 is disposed at the bottom of a cavity 62 which extends inwardly from the intermediate pressure cavity 42 to the high pressure cavity 24. The high pressure valve seat is provided with a nozzle passage 64 and is compressed against the bottom of the cavity by a threaded retaining nut 66 having a comparable passage 64' which registers with and forms an extension of the nozzle passage 64 thereby forming a continuous passage between the high pressure chamber 24 and the intermediate pressure chamber 42. The valve seat is effectively provided with a gas-tight seal by means of an O-ring shown at 68 that is compressed against the bottom shoulder of the cavity 62.

A ball valve element 70 is arranged to be seated against the terminal orifice of the nozzle passage 64 and is held thereagainst under the slight seating pressure of a spring element 72 and the inlet gas pressure. A valve stem 74 extending through the elongated passage 64—64' is adapted to transmit the loading imparted thereto by the diaphragm 46 to the ball valve element 70 so that the ball element may be adjusted to regulate the flow of gas through the high pressure orifice in response to the pressure within the intermediate pressure chamber 44. The stem is of reduced diameter at its terminal portion 74' so that during axial movement it will not touch or deform the seat material 60 in the proximity of the nozzle opening 64. The remaining portion of the stem is of circular cross section and is of such a diameter that the clearance thereof in the passage accommodates the required gas flows. Such clearances, however, are sufficiently small that the stem is guided in the passage and the inner end 74' of reduced diameter desirably centered substantially in the nozzle opening 64.

A second stage nozzle orifice shown at 76 is formed in a threaded insert 80 seated in a cavity 81 at the bottom of a bore 82 within the cylindrical protruding portion 22 of the valve body. The insert 80 has an enlarged inlet passage 84 which registers with an extension passage 86 opening into the intermediate pressure chamber 44. A conical type valve element 88 having a projecting stem portion 90 extending through the second stage orifice is supported in normal close position against the nozzle opening by means of a coil spring 92. The stem 90 provides a clearance to allow gas flow through the orifice 76. The compression of the coil spring 92 is determined by the spacing between the shoulder of the valve element on which the spring acts at one end and the bottom of the recess 81 against which the opposite end of the spring is received. The insert 80 is thread into cavity 81, with the aid of tool receiving slots 93 to facilitate its threaded assembly. The engagement between the valve seat and the conical portion of the valve element 88 is rendered gas-tight by the provision of an O-ring member 94 which is compressed into insert 80 and is retained by the valve element and gas pressure in passage 84. The insert 80 is sealed in its cavity by means of an O-ring 95.

An intermediate stage pressure relief device is provided in the regulator to prevent damage to the mechanism in the vent of leakage in the high pressure valve seal. Such a relief valve is shown at 160 which, it will be seen, is compressed against the outer end of a transverse passage 162 intersecting with the passage 86 in communication with the intermediate stage cavity. The relief valve element is seated by a compression spring 164 calibrated so as to prevent the relief valve from opening in the normal range of operating pressures in the intermediate stage. The relief valve assembly is retained in the valve body by a retaining plug 166 having vent passages provided by the clearance space between the valve stem 167 and the bore 168 through which the excess pressure may be vented to the ambient atmosphere.

A plug member shown at 96 is threadedly received in the outer end of the cylindrical bore 82 to form therein a delivery pressure chamber 98. The chamber is effectively sealed by the compression of an O-ring 100 carried in a cavity in the closure plug 96 which is compressed against the confronting wall of the cylindrical body portion 22. An elongated threaded stem 102 is threadedly received in an opening 104 in the closure plug and carries in its inner end an aneroid bellows 106. The stem is sealed by an O-ring 102'. As seen in the partial sectional view of FIG. 6, a delivery conduit 107 carries the delivery gas from the delivery pressure chamber to a regulator outlet 107'.

Referring to the enlarged sectional view of FIG. 5, it may be seen that the end 108 of the bellows is provided with an elongated threaded post 110 which is threaded into a socket 112 in the stem 102. A lock washer 114 is interposed between the end plate of the bellows and the end of the adjustable stem 102 so that upon tightening of the threaded post 110 the bellows is substantially rigidly mounted at the inner end of the adjustable stem 102 with the outer end 106' thereof free to move inwardly or outwardly in response to the existing pressure conditions within the delivery pressure chamber 98. The bellows 106 is of a conventional type, preferably of metal such as stainless steel, having its inner space evacuated and effectively sealed. Thus, the effective pressure within the bellows is substantially zero and remains fixed so that the bellows will reliably respond to the surrounding pressure within the delivery pressure chamber 98 without reference to the pressure of the ambient atmosphere.

The delivery pressure which is maintained by the operation of the first and second stages of the regulator device is determined by the adjustment of the adjusting screw 102. The threading of this stem causes the inner end 106' of the bellows to move inwardly or outwardly with respect to the terminal end of the stem 90 of the second stage valve element. This valve, thus, is opened and closed in response to a predetermined pressure within the delivery pressure chamber depending upon the adjusted position of the bellows therein. The various angular settings of the adjusting screw 102 may be calibrated with respect to specified delivery pressures and denoted by means of a series of spaced radial grooves 116 extending longitudinally in the interior face of the end plug 96. A ball detent 118 urged outwardly by means of a spring 120 will thus permit specified delivery pressures to be obtained at various ascertainable settings of the adjusting screw.

Such construction and arrangement of control mechanism for the second stage of the regulator is extremely advantageous in the present device, especially in achieving the objective of a precise means of pressure regulation independently of the surrounding atmosphere and embodying such mechanism in as compact a construction as possible. It will be seen that the support of the bellows at the interior of the adjustable stem in the manner described permits a range of delivery pressures to be obtained without requiring additional mechanisms such as auxiliary spring elements and the like which would otherwise add to the weight and bulk of the apparatus in order to permit such adjustment of the delivery output. Generally, this arrangement provides a maximum deflection rate, affording optimum precision and enhancing the regulation characteristics of the regulator while retaining its desired compactness and lightness of weight. It will be seen that such design affords a readily accessible and externally adjustable aneroid bellows mechanism for a delivery regulator without disadvantageously connecting such aneroid with the movable regulator element or adding to the mass or complexity of the movable value element and thereby interfering with its responsiveness.

Figure 3:
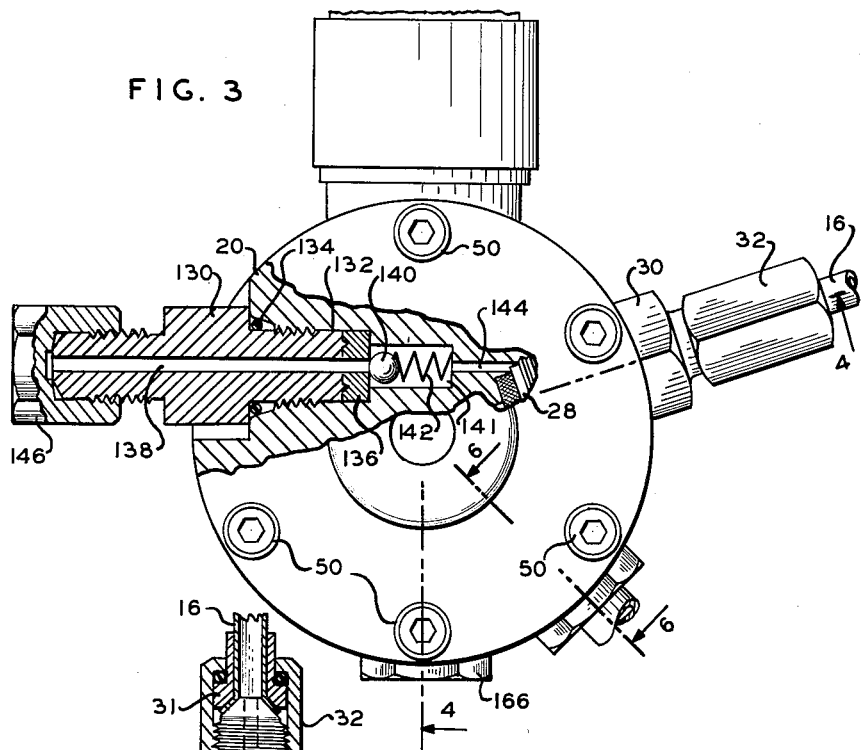
FIG. 3 is a side elevation view of the regulator valve seen in FIG. 1, including partial broken sections showing the filling inlet.

One of the significant difficulties imposed by the storage of oxygen in the storage container at relatively elevated pressures as herein described is associated with the detrimental effects that such pressures may have on the regulator upon sudden admission to the regulator inlet, such as would occur in conventional types of storage and delivery system. Thus, in conventional cylinder systems, the regulator is detached from the cylinder valve to permit the cylinder to be charged with the desired filling pressure and is thereupon reattached and the cylinder valve opened to admit such high pressure gas to the inlet of the regulator. In the pressure levels with which the present invention is particularly concerned, sudden admission of such gas to the inlet of the regulator may injuriously affect the operating mechanism thereof. In addition, the heat produced by recompression of gases in the inlet of the regulator is greatly magnified due to the elevated cylinder pressure. Thus, potential hazards of ignition of the seat material or other materials which might become ignited in the presence of such resulting temperatures are greatly magnified. In the present device, these difficulties are effectively overcome by arranging the regulator 18 so that it may be permanently attached to the container and the container filled without requiring the detachment of the regulator therefrom. In this manner, the inlet of the regulator is continuously subjected to the container pressure so that sudden admission of high pressure to the regulator is avoided. This arrangement may be seen in FIG. 3. Referring to this figure of the drawings, it may be seen that an inlet fixture 130, which is substantially identical to the inlet fitting 30, extends outwardly from the body 20 of the regulator. The fitting 130 is received in a cavity 132 and sealed therein by means of an O-ring gasket device 134. The threaded shank of the fitting bears inwardly against a compressible disc 136 forming a valve seat having a central passage 138. A ball check element 140 disposed within an enlarged cavity 141 and having a seating spring 142 seats against the inner end of the passage 138. A passage 144 extends from the inner end of the chamber 141 and intersects with the bottom of the inlet cavity 28, above the porous filter plug 38 so that foreign particles from the filling system do not have access to the regulator mechanism. As shown in the present drawings, the auxiliary inlet fitting 130 or filling inlet is sealed off by a blind nut 146. It will be understood, however, that when it is desired to charge the container 12 with gas that this nut is removed and a suitable high pressure delivery line connected thereto in substantially the same manner as the delivery line 16 is connected to the regulator inlet 30. In practice, the gas delivered and charged into the container 12 is gradually raised in pressure until the desired high storage pressure is achieved. Thus, the gas delivered through the filling inlet 130 is effective to unseat the ball check element 140 and is allowed to pass through the cavity 141 and passage 144 to the inlet cavity 28. From thence, it may be seen that such gas will pass through the regulator inlet fitting 30 and connecting conduit 16. During this filling operation, the regulator ordinarily will not be functioning to deliver gas so that the low pressure valve element 88 will be seated in closed position. When the interstage pressure in cavity 44 is above a predetermined pressure, the high pressure valve 70 will also be closed. It will be seen that as the pressure is progressively increased within the container by the continuous delivery of gas through the filling inlet that the inlet passages of the regulator are continuously subjected to such increasing pressures. Check valve 140 will respond when the filling line is disconnected from the filling inlet 130 to prevent the discharge of gas therethrough. The nut 146 is preferably applied to the filling adapter to insure against any small leaks that might possibly occur at the seat of the check valve 140.

In operation, it will be seen that the regulator responds in the usual manner to deliver a stream of gas from the container through the delivery outlet at a pressure depending upon the adjacent of the second stage of the regulator as determined by the setting of the adjusting stem 102. A system as represented by the chamber 150 in FIG. 1 may include various means for consuming the oxygen or container gas delivered thereto by delivery conduit 152 which is received on the regulator outlet 107'. Thus, for example, the chamber may represent an enclosure within which a person is to be provided with a sufficient amount of oxygen to support respiration. It will be apparent that as the oxygen is consumed in such a system a partial reduction of pressure will occur, for example, when the carbon dioxide resulting from respiration is removed by suitable absorber means. If it is assumed that the system is initially at a pressure corresponding to the predetermined delivery pressure of the regulator 18, such reduction in pressure is reflected in the delivery pressure cavity 98 of the regulator. In response to such reduction in pressure, it will be seen that the bellows 106 will expand such that the free terminal end 106' thereof will move toward the valve nozzle causing the valve element to move away therefrom and, thus, allow an increase in the flow of gas into the delivery cavity. Such flow of gas to the delivery pressure chamber 98 will occur until the initial desired delivery pressure is restored. In the event that the consumption of gas decreases so as to produce an increase in the delivery line, the bellows 106 will operate in the opposite manner, contracting and allowing a reduction in the second stage nozzle opening, either reducing or altogether stopping the gas flow until the desired pressure is reinstated. By continuous response of the bellows device in this manner, the delivery outlet of the regulator may be maintained substantially constant at the predetermined delivery pressure.

It will be understood that the invention is not limited to the specific embodiments hereinabove described but may be used in other ways without departure from the scope of the invention as defined in the following claims.

I claim:

1. A pressure regulator device adapted for delivering gases from a source of relatively high pressure at a substantially lower precise desired delivery pressure comprising a gas inlet, valve passage means including a regulator valve element connecting with said gas inlet and opening into a delivery pressure chamber and discharge passage means connecting said delivery pressure chamber with a discharge outlet, said delivery pressure chamber comprising a cylindrical bore receiving said valve passage means substantially concentrically at the inner end thereof and receiving at its outer open end a removable closure cap threadedly engageable therein and having an O-ring forming a gas seal with said delivery pressure chamber, said removable end closure having an elongated axially disposed bore in the inner end thereof terminating in a threaded opening, a valve stem having a threaded portion extending through said threaded opening in said end closure and a smooth cylindrical portion extending through said axially disposed bore and carrying O-ring sealing means to effect a gas-tight seal between said valve stem and said bore, an evacuated bellows element having a threaded portion tightly threaded into an axially disposed socket-opening in the inner end of said valve stem so as to mount said bellows substantially rigidly at the inner end of said valve stem in substantially confronting relation to the terminal end of said valve passage in operative relation to said valve element projecting therethrough, said assembly of said valve stem, bellows and end closure being removable as a unit from said delivery pressure chamber and said bellows being independently adjustable longitudinally of the bore of said delivery pressure chamber by a threaded adjustment of the external portion of said valve stem to permit selective adjustment of the desired delivery pressure of said regulator.

2. A regulator device in accordance with claim 1 wherein a locking element carried by said valve stem is resiliently urged outwardly and a series of circumferentially spaced longitudinal grooves are formed in the inner bore of said end closure means such that said locking means acting cooperatively with said circumferentially spaced grooves provides detent means for resiliently locking said valve stem in selected angular positions corresponding to different selected delivery pressures.

References Cited in the file of this patent
UNITED STATES PATENTS

| | | |
|---|---|---|
| 2,195,728 | Jones | Apr. 2, 1940 |
| 2,313,149 | Jacobson | Mar. 9, 1943 |
| 2,523,906 | Holmes | Sept. 26, 1950 |
| 2,544,991 | Holmes | Mar. 13, 1951 |
| 2,596,178 | Seeler | May 13, 1952 |
| 2,645,884 | Kellie | July 21, 1953 |
| 2,685,300 | Hammin | Aug. 3, 1954 |
| 2,816,561 | Krueger | Dec. 17, 1957 |
| 2,918,930 | Jansen | Dec. 29, 1959 |